(12) United States Patent
Nagami (10) Patent No.: US 10,072,700 B2
(45) Date of Patent: Sep. 11, 2018

(54) HINGE MECHANISM AND ELECTRONIC DEVICE PROVIDED WITH THE SAME

(71) Applicant: MITSUBISHI ELECTRIC CORPORATION, Tokyo (JP)

(72) Inventor: Tetsuro Nagami, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/555,885

(22) PCT Filed: Apr. 3, 2015

(86) PCT No.: PCT/JP2015/060647
§ 371 (c)(1),
(2) Date: Sep. 5, 2017

(87) PCT Pub. No.: WO2016/157529
PCT Pub. Date: Oct. 6, 2016

(65) Prior Publication Data
US 2018/0051741 A1  Feb. 22, 2018

(51) Int. Cl.
*F16C 11/10* (2006.01)
*B60R 11/02* (2006.01)
(Continued)

(52) U.S. Cl.
CPC .......... *F16C 11/10* (2013.01); *B60R 11/0229* (2013.01); *E05D 7/00* (2013.01); *B60R 2011/0028* (2013.01); *B60R 2011/0085* (2013.01); *E05Y 2900/606* (2013.01); *Y10T 16/54029* (2015.01)

(58) Field of Classification Search
CPC .. F16C 11/10; B60R 11/0229; B60R 11/0235; B60R 2011/0028; B60R 2011/0085; E05D 7/00; E05D 11/1028; E05D 11/08; E05D 11/087; E05Y 2900/606; G06F 1/1616; G06F 1/1681;
(Continued)

(56) References Cited

U.S. PATENT DOCUMENTS 6,256,837 B1 * 7/2001 Lan ..................... B60R 11/0235
                                                       16/334
6,918,159 B2 * 7/2005 Choi ..................... G06F 1/1616
                                                       16/293
(Continued)

FOREIGN PATENT DOCUMENTS

JP     11-214859 A    8/1999
JP     11-248341 A    9/1999
(Continued)

*Primary Examiner* — William L Miller
(74) *Attorney, Agent, or Firm* — Birch, Stewart, Kolasch & Birch, LLP (57) ABSTRACT

A through-hole of a flat spring has a shape that defines an opening area larger than the cross-sectional area of an end segment of a shaft and is subject to contact with the rotating end segment. A through-hole of a plate has an opening area larger than the cross-sectional area of the end segment and smaller than the opening area of the through-hole. The end segment is inserted through the through-hole and the through-hole and is swaged to form a space between the through-hole and the end segment, and the space is filled with grease.

3 Claims, 10 Drawing Sheets

(51) Int. Cl.
 *E05D 7/00* (2006.01)
 *B60R 11/00* (2006.01)

(58) Field of Classification Search
 CPC ......... Y10T 16/54029; Y10T 16/54028; Y10T 16/5403; Y10T 16/5385
 USPC ........ 16/334, 335, 337, 297; 403/83, 84, 91; 296/24.34, 37.7, 37.5; 224/311; 379/433.13; 361/679.27; 455/575.3; 40/606.15, 593
 See application file for complete search history.

(56) References Cited

U.S. PATENT DOCUMENTS

| | | | | |
|---|---|---|---|---|
| 7,021,728 | B2* | 4/2006 | Donovan | E05D 11/087 16/358 |
| 7,508,656 | B2* | 3/2009 | Okahara | B60R 11/0235 16/337 |
| 7,975,350 | B2* | 7/2011 | Nagami | B60R 11/0235 16/334 |
| 8,413,303 | B2* | 4/2013 | Nagami | F16C 11/10 16/334 |
| 8,418,319 | B2* | 4/2013 | Nagami | B60R 11/0235 16/297 |
| 8,646,153 | B2* | 2/2014 | Nagami | E05D 11/1028 16/334 |
| 2006/0021195 | A1* | 2/2006 | Yamada | G06F 1/162 16/367 |
| 2010/0128458 | A1* | 5/2010 | Nagami | B60R 11/0235 361/825 |
| 2011/0072699 | A1* | 3/2011 | Ikunami | B60R 11/0235 40/606.15 |
| 2011/0075335 | A1* | 3/2011 | Nagami | B60R 11/0235 361/679.01 |
| 2011/0154616 | A1* | 6/2011 | Nagami | B60R 11/0235 16/333 |
| 2011/0239405 | A1* | 10/2011 | Nagami | F16C 11/10 16/277 |
| 2012/0036680 | A1* | 2/2012 | Nagami | B60R 11/0235 16/297 |

FOREIGN PATENT DOCUMENTS

| | | |
|---|---|---|
| JP | 2006-105275 A | 4/2006 |
| JP | 5236014 B2 | 7/2013 |
| JP | 5393671 B2 | 1/2014 |

\* cited by examiner

HINGE MECHANISM AND ELECTRONIC DEVICE PROVIDED WITH THE SAME

TECHNICAL FIELD

The present invention relates to a hinge mechanism provided on, for example, a monitor device installed on a ceiling of a vehicle and rotatably supports a monitor panel, and an electronic device including the hinge mechanism.

BACKGROUND ART

A conventional hinge device disclosed in patent literature 1 supports the other member in a manner rotatable to one member. In a ceiling-mounted monitor device, for example, the one member is a base member mounted on the ceiling of a vehicle and the other member is a monitor panel. The monitor panel is rotatably supported to the base member by the hinge device.

The hinge device disclosed in patent literature 1 includes a bracket, a shaft, a brake member, a flat spring member, and a torsion spring.

The bracket is a member fixed to the base member. The shaft is a rotating shaft fixed to the monitor panel. The brake member is a flat member fixed to the shaft, and rotates together with the shaft in an urged state toward the bracket. The flat spring member is a member fixed to the shaft and urges the brake member toward the bracket. The torsion spring is wound around the shaft and applies a rotational force to the shaft. The torsion spring applies an initial torque to the shaft when the monitor panel is rotated.

A protrusion is formed on a surface of the brake member on the side facing the bracket. On a surface of the bracket facing the brake member, a tapered groove or a depressed groove whose opening width is gradually increased, in which the protrusion of the brake member moves in contact with them, and a hole that receives the protrusion of the brake member are formed.

The brake member, the bracket, the flat spring member, and a washer are placed on an end segment of the shaft in this order, and the end segment is swaged to retain these components.

When the monitor panel is unlocked from a stored position in the base member, the monitor panel pops out from the base member caused by the initial torque of the torsion spring.

While the protrusion of the brake member is moving through the tapered groove or the depressed groove of the bracket, the torque gradually decreases because the urging of the protrusion is gradually damped by the tapered groove or the depressed groove.

High torque is generated when the protrusion of the brake member moves out of the tapered groove or depressed groove of the bracket and onto the side surface of the bracket, and a maximum torque is generated when the protrusion of the brake member is received by the hole in the bracket. This position is the viewing position of the monitor panel.

In the above hinge device, the end segment of the shaft has a noncircular cross-section, and each of the through-holes formed in the brake member, the flat spring member, and the washer, respectively, also has the same shape as the cross-section of the end segment. This causes the brake member, the flat spring member, and the washer to rotate together with the shaft.

The opening area of each of these through-holes is formed to be larger than the cross-sectional area of the end segment of the shaft so that the end segment can be certainly inserted to the through-holes. That is, a slight gap is provided between the end segment of the shaft and the through-holes.

CITATION LIST

Patent Literature

Japanese Unexamined Patent Application Publication No. 2006-105275

SUMMARY OF INVENTION

Technical Problem

In the conventional hinge device, when the monitor panel is rotated, the brake member rotates together with the shaft. Since a gap exists between the end segment of the shaft and the through-hole in the brake member as described above, the rotation of the brake member lags behind the shaft at a distance equivalent to the gap. When the protrusion of the brake member is received by the hole in the bracket as a result of the rotation of the monitor panel, the force of the spring urging the brake member toward the bracket is released. Caused by the release of the force of the spring, the brake member instantly rotates by the distance equivalent to the gap, and the inner circumferential portion of the through-hole of the brake member strongly collides with the end segment of the shaft.

In the conventional hinge device as described above, the impact of the protrusion of the brake member received by the hole in the bracket and the strong collision of the inner circumferential portion of the through-hole of the brake member and the end segment of the shaft cause a significantly loud collision noise every time the rotational position of the monitor panel is held at the viewing position, which is a problem to be solved.

An object of the present invention, which solves the problem described above, is to provide a hinge mechanism that can reduce the collision noise, and an electronic device having the hinge mechanism.

Solution to Problem

The hinge mechanism according to the present invention includes a shaft, a base member, a flat spring member, and a plate member. The shaft is provided so as to be coaxial with a rotation axis of the rotating body; the base member has a first engaging portion disposed on a concentric circle around the rotation axis, and rotatably supports the shaft. The flat spring member includes a first through-hole through which an end segment of the shaft is inserted and a second engaging portion holding a rotational position of the rotating body by engaging with the first engaging portion, and the flat spring member rotates together with the end segment inserted through the first through-hole. The plate member includes a second through-hole through which the end segment is inserted, and the plate member is fixed to the shaft by swaging the end segment inserted through the first through-hole and the second through-hole.

The first through-hole has a shape that defines an opening area larger than a cross-sectional area of the end segment and comes into contact with a circumferential portion of the end segment when the shaft rotates. The second through-hole has an opening area larger than the cross-sectional area of the end segment and smaller than the opening area of the first through-hole.

In the above configuration, a gap defined between a peripheral edge of an opening of the second through-hole and the end segment is covered with the end segment crushed by the swaging, and viscous material is retained in a closed space provided between the first through-hole and the end segment.

Advantageous Effects of Invention

According to the present invention, by filling viscous material in the closed space formed between the first through-hole and the end segment of the shaft, the movement of the flat spring member slows down, and as a result, the collision of the inner circumferential portion of the first through-hole and the end segment of the shaft is alleviated, so that the collision noise can be reduced.

BRIEF DESCRIPTION OF DRAWINGS

FIGS. 1A and 1B illustrate a hinge mechanism according to a first embodiment of the present invention, in which

FIGS. 9A to 9C illustrate the state of the hinge mechanism when the monitor panel is held at the stored position, in which

FIGS. 10A to 10C illustrate the state of the hinge mechanism when the monitor panel rotates from the stored position by its own weight, in which

FIGS. 11A to 11E illustrate the state of the hinge mechanism when the monitor panel is held at the viewing position, in which FIG. 11C illustrates the state of the hinge mechanism when the monitor panel is held at the viewing position.

DESCRIPTION OF EMBODIMENTS

Embodiments of the present invention will now be described in detail with reference to the accompanying drawings.

First Embodiment

Figure 1A:
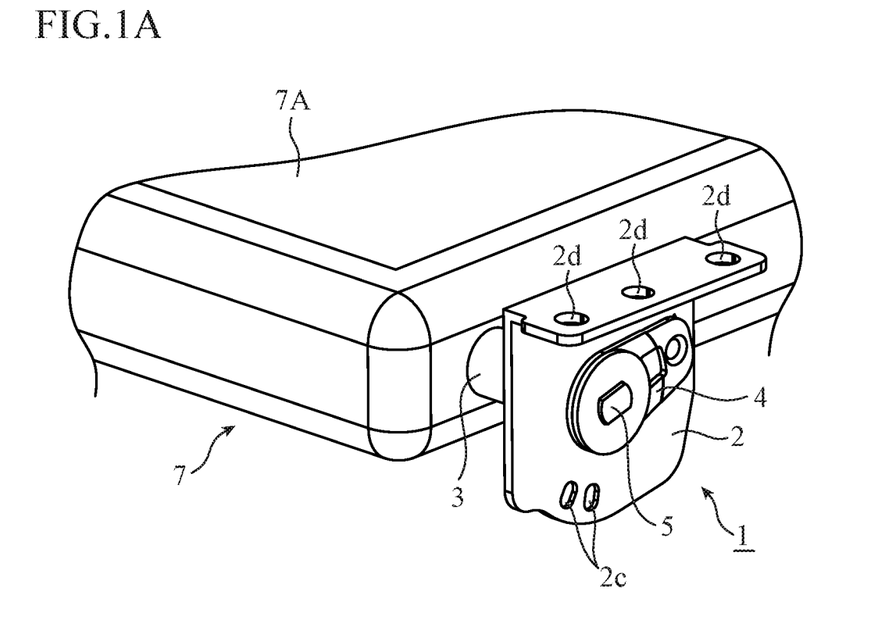
FIG. 1A is a perspective view of the hinge mechanism.
Figure 1B:
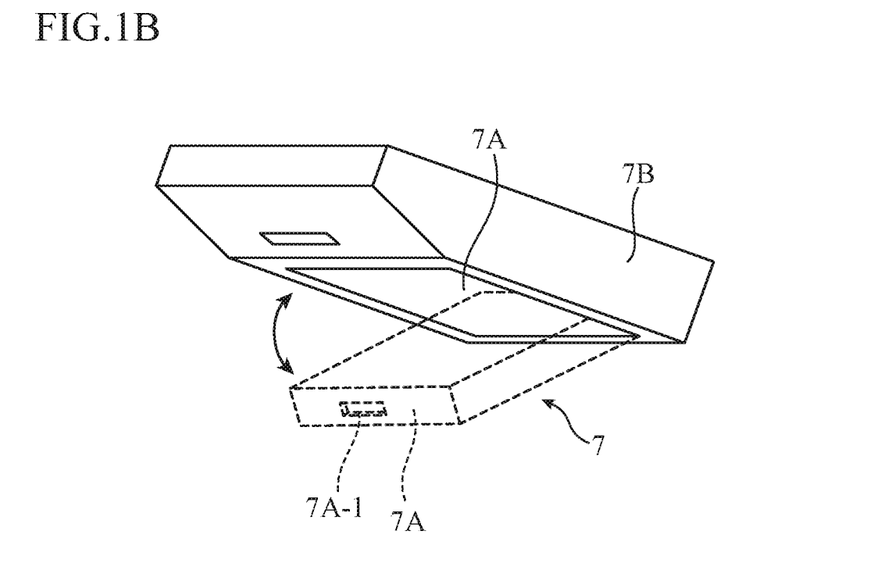
FIG. 1B is a perspective view of a monitor device provided with the hinge mechanism.
Figure 2:
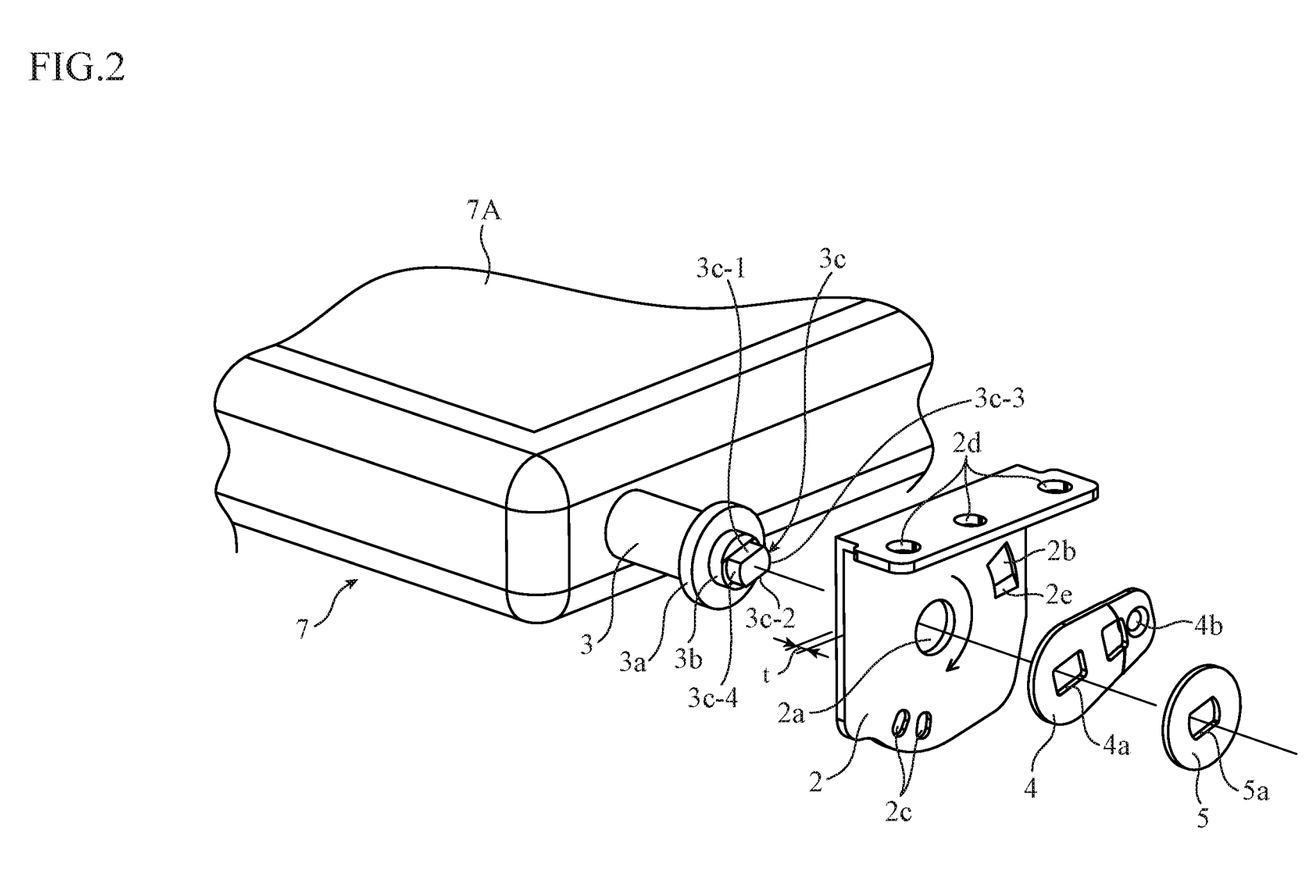
FIG. 2 is an exploded perspective view of the hinge mechanism shown in FIG. 1A.

FIG. 1 is a perspective view of a hinge mechanism 1 according to a first embodiment of the present invention: FIG. 1A is a perspective view of the hinge mechanism 1, and FIG. 1B is a perspective view of a monitor device 7 having the hinge mechanism 1. FIG. 2 is an exploded perspective view of the hinge mechanism 1 shown in FIG. 1A. FIGS. 1 and 2 illustrate a ceiling-mounted monitor device 7 as an example realizing the electronic device according to the present invention.

In the monitor device 7, a monitor panel 7A is a rotating body and an accommodating case 7B is a fixed member fixed to the ceiling of a vehicle. Namely, as indicated by an arrow in FIG. 1B, the monitor panel 7A is rotatably held on the accommodating case 7B by the hinge mechanism 1.

In FIG. 1A, a base 2 is a component which is an example realizing a base member according to the present invention. The bases 2 rotatably support a shaft 3 protruding from the both side surfaces of the monitor panel 7A.

The shaft 3 is fixed to the monitor panel 7A to be coaxial with the rotation axis of the monitor panel 7A. The base 2 is a plate member bent to have an L-shape in side view, as illustrated in FIG. 2. The base 2 has a rotating-shaft hole 2a, a depression 2b, and two depressions 2c on the surface facing a side surface of the monitor panel 7A. Screw holes 2d are disposed on the top portion of the base 2.

The shaft 3 has a flange portion 3a, a small diameter segment 3b, and an end segment 3c, which are formed to be coaxial with each other.

In the hinge mechanism 1, the small diameter segment 3b of the shaft 3 is inserted through the rotating-shaft hole 2a of the base 2; a flat spring 4 and a plate 5 are assembled to the end segment 3c at the tip of the small diameter segment 3b; and then the end segment 3c is swaged. The base 2 is fixed to the accommodating case 7B with screws inserted through the screw holes 2d.

The depressions 2b and 2c are formed on a concentric circle around the rotation axis on the surface of the base 2 having the rotating-shaft hole 2a. The rotation axis corresponds to the rotational center of the shaft 3 inserted through the rotating-shaft hole 2a.

The depression 2b is not in contact with a protrusion 4b in a stored state of the monitor panel 7A. The depression 2b is provided with a tapered portion 2e having a tilting surface such that the depth of the depression 2b gradually decreases in the direction of an arrow shown in FIG. 2.

The depressions 2c are elements each of which is an example realizing a first engaging portion according to the present invention, and hold the monitor panel 7A at a rotational position corresponding to the viewing position by engaging with the protrusion 4b. In the example illustrated in FIG. 1, two depressions 2c are formed on the concentric circle around the rotation axis, and can hold the monitor panel 7A at viewing positions at two different rotational angles.

The flange portion 3a of the shaft 3 has a diameter larger than that of the rotating-shaft hole 2a and the small diameter segment 3b and the end segment 3c are formed to be concentric with the flange portion 3a. The small diameter segment 3b has a diameter slightly smaller than that of the rotating-shaft hole 2a so that the small diameter segment 3b can fit into the rotating-shaft hole 2a. The small diameter segment 3b has an axial length larger than the thickness t of the base 2.

The end segment 3c has a diameter smaller than that of the small diameter segment 3b and has two symmetrical flat surfaces 3c-1 and 3c-2. The side surfaces adjoining the flat surfaces 3c-1 and 3c-2 are two arcuate portions 3c-3 and 3c-4.

In the configuration described above, the end segment 3c has a diameter smaller than that of the small diameter segment 3b. Alternatively, the end segment 3c may have the same diameter as that of the small diameter segment 3b.

The flat spring 4 is a component which is an example realizing a flat spring member according to the present invention. The flat spring 4 has a through-hole 4a and a protrusion 4b. The through-hole 4a is an element which is an example realizing a first through-hole according to the present invention in which the end segment 3c of the shaft 3 are inserted through. The through-hole 4a has a rectangular shape. Besides having a strictly rectangular shape, the through-hole 4a may have a substantially rectangular shape having rounded corners as illustrated in FIG. 2, or the like.

The protrusion 4b is an element which is an example realizing a second engaging portion according to the present invention. The protrusion 4b engages with one of the depressions 2c of the base 2 to hold a rotational position of the monitor panel 7A, as described before.

The plate 5 is a component which is an example realizing a plate member according to the present invention, and has a through-hole 5a through which the end segment 3c is inserted through. The plate 5 is fixed to the shaft 3 by swaging the end segment 3c which is inserted through the through-hole 4a, and further inserted through the through-hole 5a. The through-hole 5a is an element which is an example realizing a second through-hole according to the present invention.

Next, the relation among the end segment 3c of the shaft 3, the through-hole 4a of the flat spring 4, and the through-hole 5a of the plate 5 will be described in detail.

Figure 3:
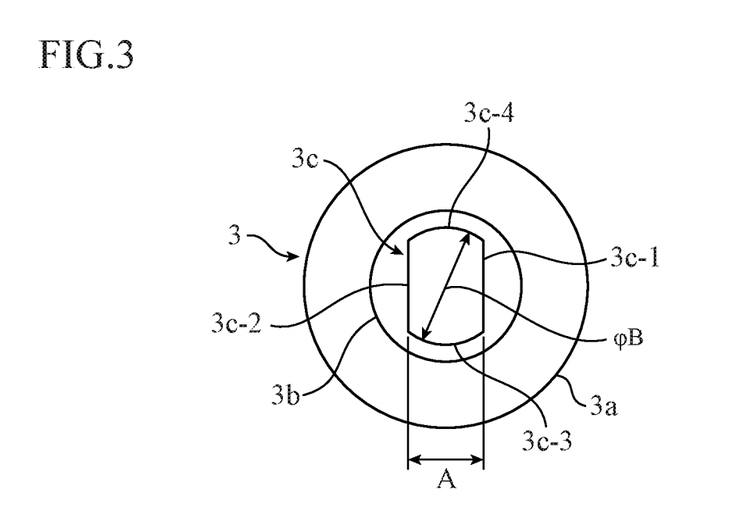
FIG. 3 is a front view of the shaft shown in FIG. 1A.
Figure 4:
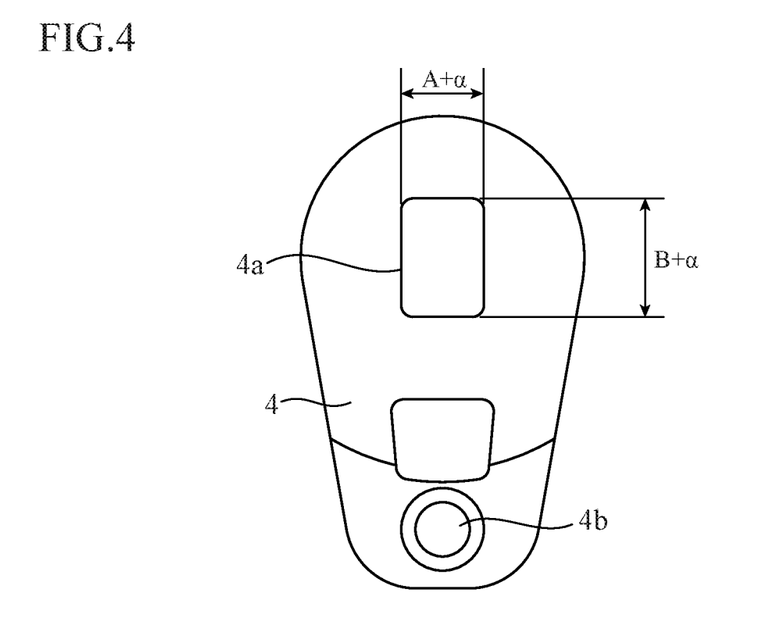
FIG. 4 is a front view of the flat spring shown in FIG. 1A.
Figure 5:
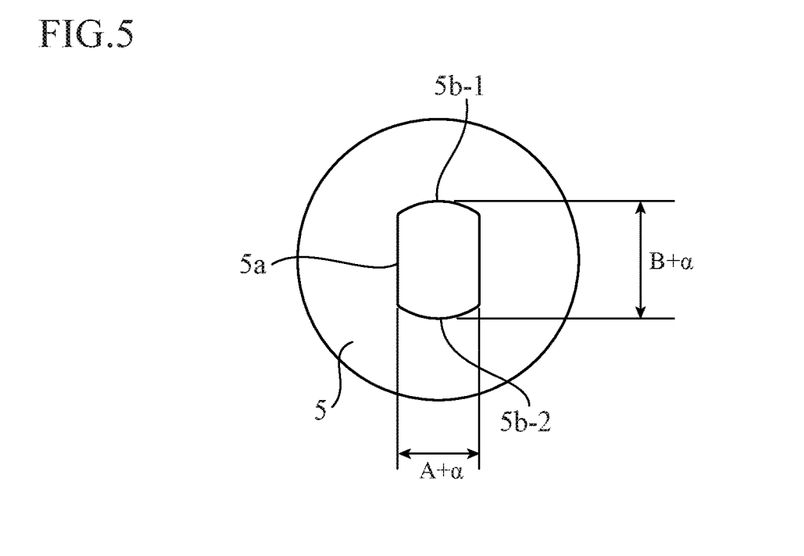
FIG. 5 is a front view of the plate shown in FIG. 1A.
Figure 6:
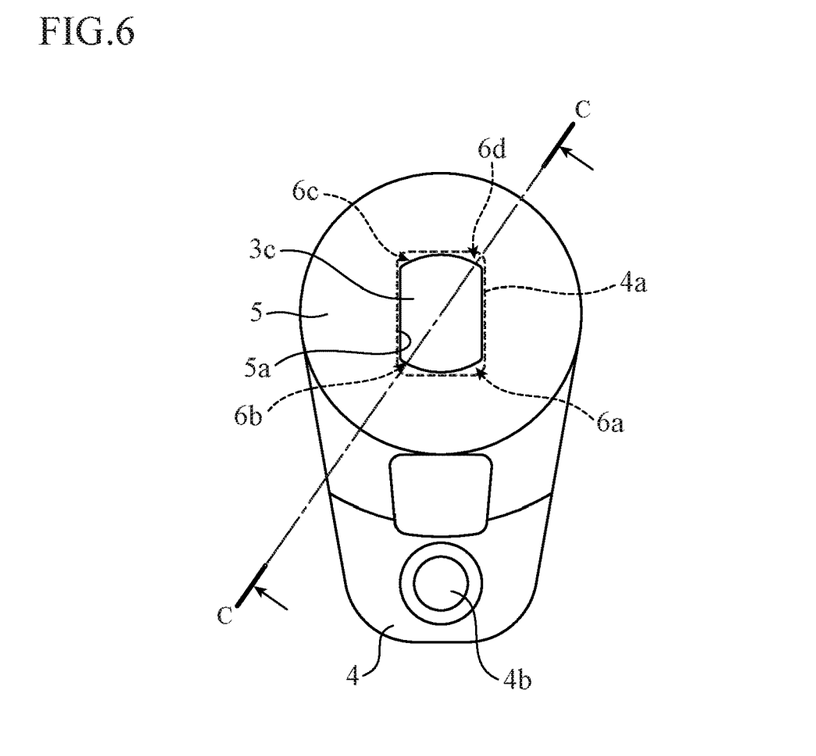
FIG. 6 illustrates the shaft to which the flat spring and the plate are assembled in order.

FIG. 3 illustrates the shaft 3 shown in FIG. 1A, viewed from the axial direction of the shaft 3. FIG. 4 is a front view of the flat spring 4 shown in FIG. 1A. FIG. 5 is a front view of the plate 5 shown in FIG. 1A. FIG. 6 illustrates the shaft 3 to which the flat spring 4 and the plate 5 are assembled in order, viewed from the axial direction of the shaft 3. In FIG. 6, the through-hole 4a of the flat spring 4 behind the plate 5 is drawn by a dashed line.

Figure 7:
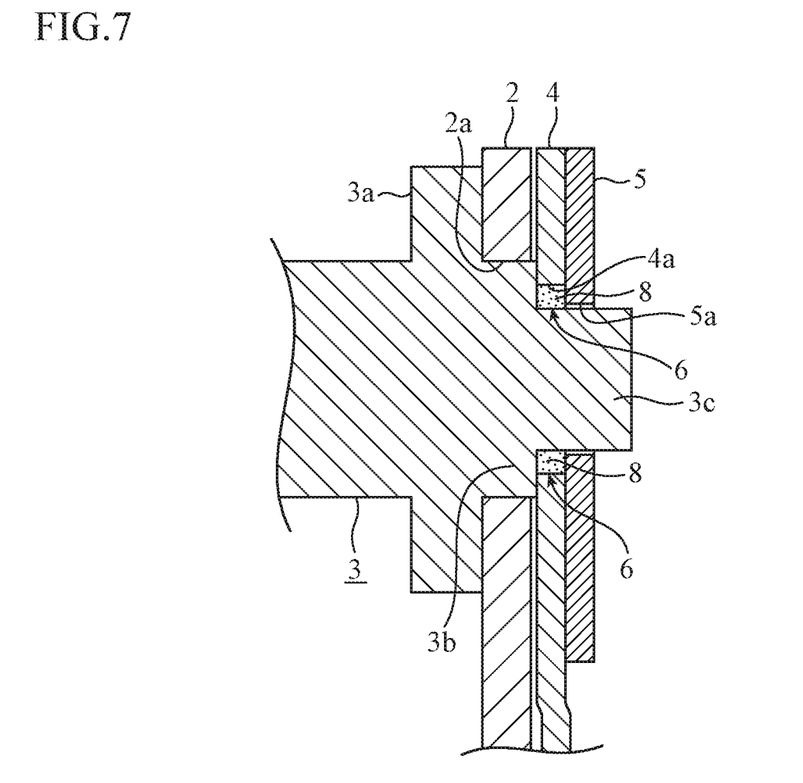
FIG. 7 is a sectional view on arrows of the hinge mechanism taken along the line C-C in FIG. 6 before swaging the end segment.
Figure 8:
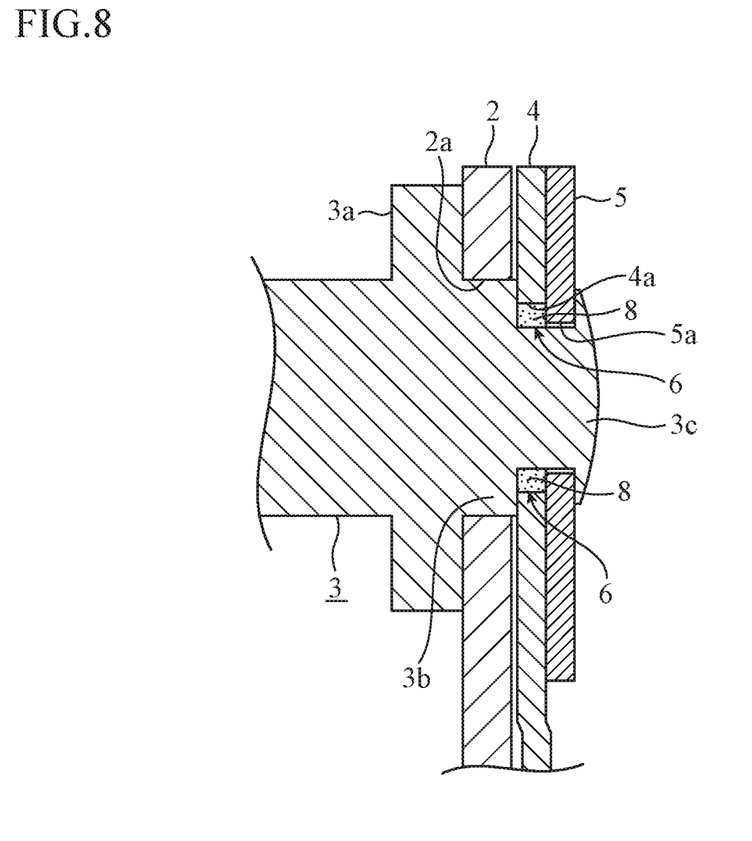
FIG. 8 is a sectional view on arrows of the hinge mechanism taken along the line C-C in FIG. 6 after swaging the end segment.

FIG. 7 is a sectional view on arrows of the hinge mechanism 1 taken along the line C-C in FIG. 6 before swaging the end segment 3c. FIG. 8 is a sectional view on arrows of the hinge mechanism 1 taken along the line C-C in FIG. 6 after swaging the end segment 3c.

For example, with reference to FIG. 4, the through-hole 4a of the flat spring 4 has a width of A+α and a length of B+α, where φB is the diameter of the circle defined by the arcuate portions 3c-3 and 3c-4 of the end segment 3c and A is the width between the flat surfaces 3c-1 and 3c-2, as illustrated in FIG. 3. With reference to FIG. 5, the through-hole 5a of the plate 5 has a width of A+α and a length of B+α, where α is a margin for fitting. The through-holes 4a and 5a each have an opening area larger than the cross-sectional area of the end segment 3c on a plane orthogonal to the axial direction. The through-hole 5a has a shape defined by arcuate portions 5b-1 and 5b-2, like the end segment 3c, and has an opening area smaller than that of the through-hole 4a having a rectangular shape. The margin for fitting in the width may differ from the margin for fitting in the length.

With reference to FIG. 6, after the end segment 3c is inserted into the through-hole 4a, spaces 6a, 6b, 6c, and 6d are formed at the four corners between the outer circumference of the end segment 3c and the inner circumference of the through-hole 4a. Hereinafter, the spaces 6a, 6b, 6c, and 6d are collectively referred to as the spaces 6, as appropriate. The spaces 6 are filled with viscous material such as grease 8. For example, the grease 8 is applied into the spaces 6, or the end segment 3c is inserted into the through-hole 4a after the grease 8 is applied to the outer circumference of the end segment 3c, the edge of the rotating-shaft hole 2a, or the four corners of the through-hole 4a. The spaces 6 are thereby filled with the grease 8, as illustrated in FIG. 7.

After the end segment 3c is inserted into the through-hole 5a, the arcuate portions 3c-3 and 3c-4 of the end segment 3c face the arcuate portions 5b-1 and 5b-2 of the through-hole 5a, respectively. In this state, a gap having a width of approximately half of α is formed between the outer circumference of the end segment 3c and the peripheral edge of the through-hole 5a.

The end segment 3c inserted through the through-hole 5a is swaged, and as a result, the crushed end segment 3c covers the gap, as illustrated in FIG. 8. The spaces 6 are thereby closed, and thus the grease 8 stays inside the spaces 6. Even though a gap exists between the end segment 3c and the through-hole 4a, the grease 8 in the spaces 6 slows down the shifting of the flat spring 4 and serves as cushioning material to alleviate the collision of the circumferential portion of the through-hole 4a and the end segment 3c, and consequently, the collision noise can be reduced.

Next, the state of the hinge mechanism 1 at each rotational position of the monitor panel 7A will be described.

Figure 9A:
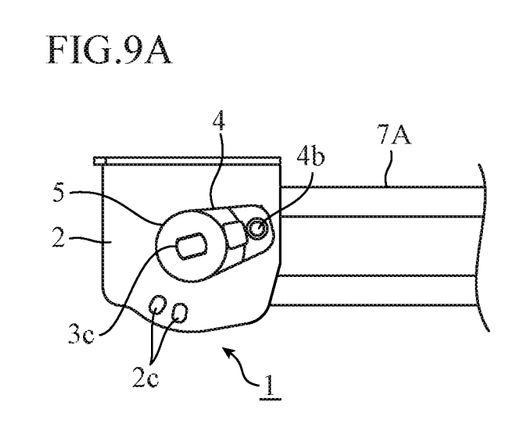
FIG. 9A is a side view of the hinge mechanism.
Figure 9B:
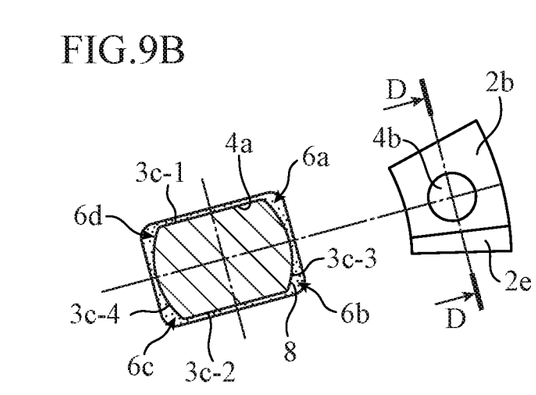
FIG. 9B illustrates the state of the end segment of the shaft and the through-hole of the flat spring, and the state of the depression of the base and the protrusion of the flat spring.
Figure 9C:
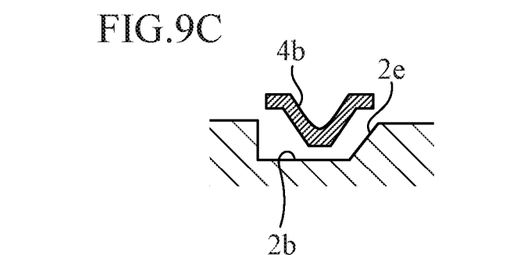
FIG. 9C is a sectional view on arrows of the configuration of FIG. 9B taken along the line D-D.

FIGS. 9A to 9C illustrate the state of the hinge mechanism 1 when the monitor panel 7A is held at the stored position: FIG. 9A is a side view of the hinge mechanism 1; FIG. 9B illustrates the state of the end segment 3c of the shaft 3 and the through-hole 4a, and the state of the depression 2b and the protrusion 4b; and FIG. 9C is a sectional view on arrows of the configuration taken along the line D-D in FIG. 9B.

In the stored position, the monitor panel 7A is stored in the accommodating case 7B as illustrated in FIG. 1B and the monitor screen is closed. This state is maintained through engagement of a latching mechanism provided inside the monitor device 7 with a latching depression 7A-1 on an end surface of the monitor panel 7A.

In the stored position, the protrusion 4b of the flat spring 4 is not in contact with the depression 2b of the base 2, as illustrated in FIGS. 9B and 9C. In this state, the surfaces of the flat spring 4 are in a state substantially parallel to a plane orthogonal to the rotation axis and thus are not subject to elastic deformation.

Further, at the stored position of the monitor panel 7A, a gap exists between the end segment 3c of the shaft 3 and the through-hole 4a of the flat spring 4. For example, between the flat surfaces 3c-1 and 3c-2 of the end segment 3c and the inner circumferential portions of the through-hole 4a opposing thereto, gaps each having a width of approximately half the margin a for fitting are formed. Also in the narrowest portions between the arcuate portions 3c-3 and 3c-4 of the end segment 3c and the inner circumferential portions of the through-hole 4a, gaps having similar dimension are formed, and the spaces 6a to 6d are formed at respective positions corresponding to the four corners of the through-hole 4a. The spaces 6a to 6d are filled with the grease 8.

Next, the state of the monitor panel 7A rotated from the stored position will be described.

Figure 10A:
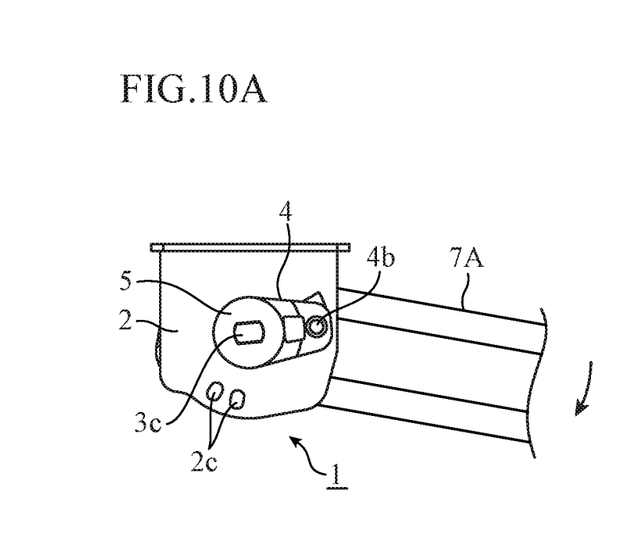
FIG. 10A is a side view of the hinge mechanism.
Figure 10B:
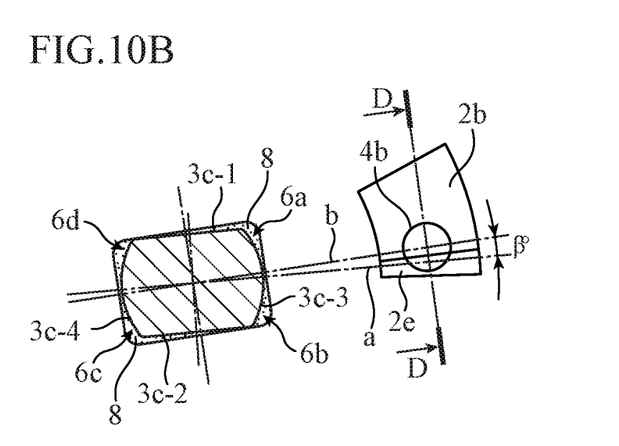
FIG. 10B illustrates the state of the end segment of the shaft and the through-hole of the flat spring, and the state of the depression of the base and the protrusion of the flat spring.
Figure 10C:
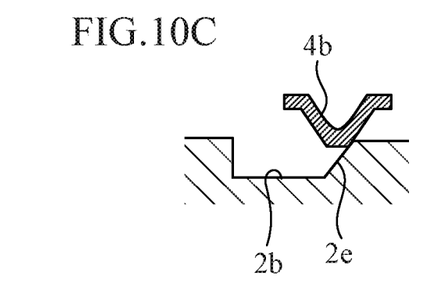
FIG. 10C is a sectional view on arrows of the configuration of FIG. 10B taken along the line D-D.

FIGS. 10A to 10C illustrate the state of the hinge mechanism 1 when the monitor panel 7A rotates from the stored position by its own weight: FIG. 10A is a side view of the hinge mechanism 1; FIG. 10B illustrates the state of the end segment 3c of the shaft 3 and the through-hole 4a, and the state of the depression 2b and the protrusion 4b; and FIG. 10C is a sectional view on arrows of the configuration taken along the line D-D in FIG. 10B.

Upon release of the latching mechanism mentioned before, the monitor panel 7A rotates by its own weight from the stored position illustrated in FIG. 9A in the direction indicated by the arrow in FIG. 10A. In this state, the end segment 3c of the shaft 3 rotates together with the flat spring 4 by a predetermined angle, and the flat spring 4 comes into contact with the tapered portion 2e, as illustrated in FIGS. 10B and 10C.

While the flat spring 4 rotates further in the direction indicated by the arrow, the protrusion 4b moves up the tilting surface in contact with the tapered portion 2e, and the tip of the flat spring 4 gradually deforms away from the surface of the base 2. At this time, the monitor panel 7A continues to rotate by its own weight while the elastic force of the flat spring 4 to restore the deformation gradually increases. An increase in the elastic force causes an increase in the rotational resistance. Consequently, when the protrusion 4b reaches a predetermined position on the tilting surface of the tapered portion 2e, the movement of the flat spring 4 stops and then the rotation of the monitor panel 7A also stops. At this time, the monitor panel 7A rotates in advance of the flat spring 4 by a distance equivalent to the gap described before and stops in a state in contact with the inner circumferential portion of the through-hole 4a of the flat spring 4. In the example illustrated in FIG. 10B, the center line b of the flat spring 4 is delayed by an angle β° to the center line a of the shaft 3.

In the stationary state after rotation of the monitor panel 7A by its own weight, the end segment 3c of the shaft 3 tilts in the rotating direction relative to the through-hole 4a of the flat spring 4. In this state, the volumes of the spaces 6a and 6c increase whereas the volumes of the spaces 6b and 6d decrease. Accordingly, the volume of the grease 8 contained in the spaces 6a to 6d varies in proportion to the volumes of the spaces 6a to 6d.

Next, the state of the monitor panel 7A further rotated from the state illustrated in FIG. 10 will be described.

Figure 11A:
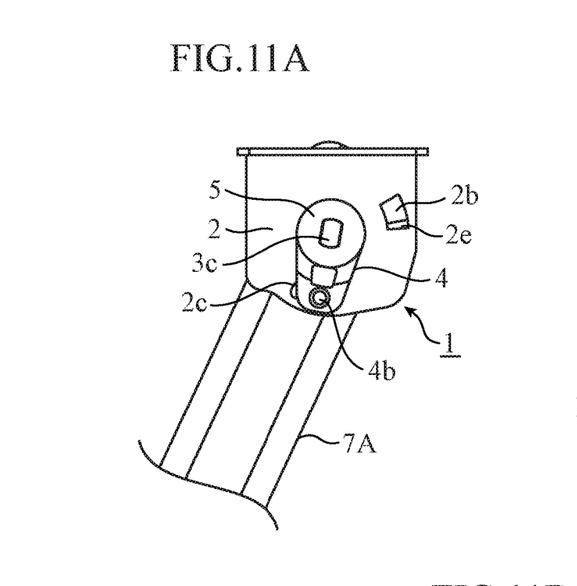
FIG. 11A is a side view of the hinge mechanism.
Figure 11B:
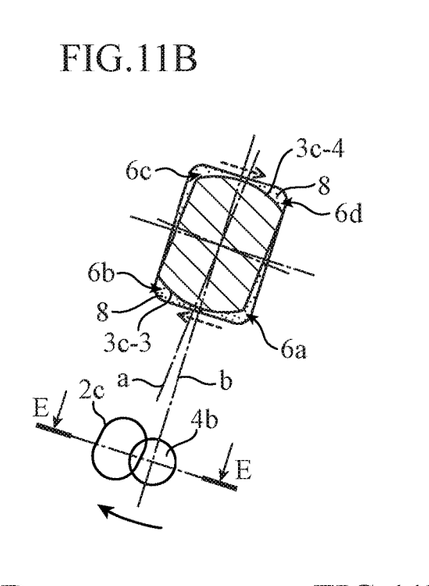
FIG. 11B illustrates the state of the hinge mechanism just before the monitor panel is held at the viewing position.
Figure 11C:
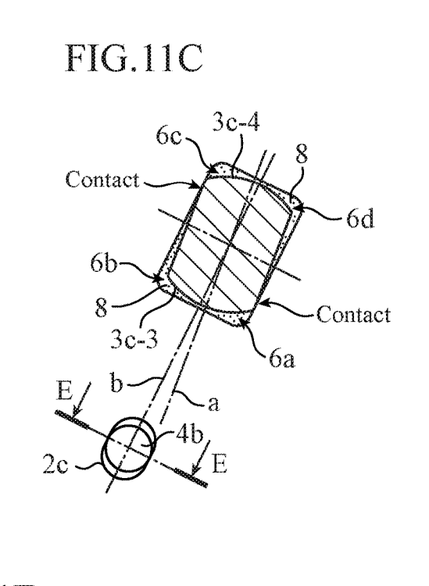
Figure 11D:
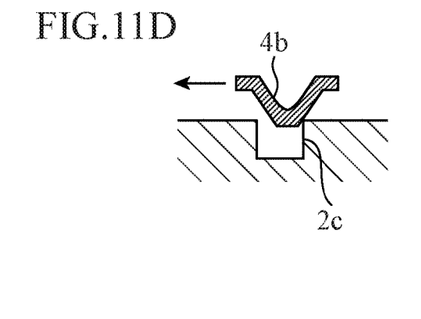
FIG. 11D is a sectional view on arrows of the configuration of FIG. 11B taken along the line E-E.
Figure 11E:
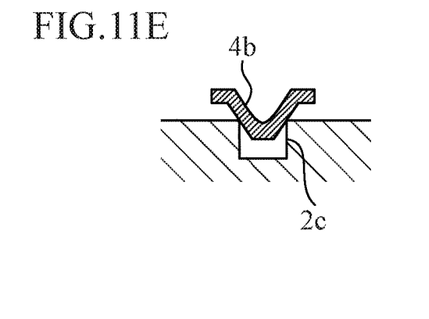
FIG. 11E is a sectional view on arrows of the configuration of FIG. 11C taken along the line E-E.

FIGS. 11A to 11E illustrate states of the hinge mechanism 1 when the monitor panel 7A is held at the viewing position: FIG. 11A is a side view of the hinge mechanism 1; FIG. 11B illustrates the state of the end segment 3c of the shaft 3 and the through-hole 4a, and the state of the depressions 2c and the protrusion 4b, just before the monitor panel 7A is held at the viewing position. FIG. 11C illustrates the state after the monitor panel 7A is held at the viewing position; FIG. 11D is a sectional view on arrows of the configuration taken along the line E-E in FIG. 11B; and FIG. 11E is a sectional view on arrows of the configuration taken along the line E-E in FIG. 11C.

A user can shift the monitor panel 7A to a position suitable for viewing images displayed on the monitor panel 7A by manually rotating the monitor panel 7A from the position illustrated in FIG. 10A to the viewing position.

While the monitor panel 7A is being rotated to the viewing position, the rotation of the flat spring 4 is delayed comparing to the rotation of the end segment 3c of the shaft 3, as illustrated in FIG. 11B. When the flat spring 4 further moves in the rotation direction and the protrusion 4b fits the depressions 2c, the elastic force of the flat spring 4, caused by the deformation thereof away from the base 2, is released.

At this time, the protrusion 4b is urged by the flat spring 4 released from the state illustrated in FIG. 11D to slide down the opening edge of a depressions 2c and fits into the depression 2c as illustrated in FIG. 11E. Thus, the flat spring 4 is about to rotate in the direction indicated by the solid arrow in FIG. 11B relative to the end segment 3c by the distant equivalent to the gap between the end segment 3c and the through-hole 4a.

In this state, if the spaces 6a to 6d are not filled with grease 8, the flat spring 4 would suddenly rotate relative to the end segment 3c due to the release of the elastic force described above. This causes the inner circumferential portion of the through-hole 4a of the flat spring 4 to strongly collide with the end segment 3c and a loud collision noise is generated.

In contrast, in the hinge mechanism 1, the spaces 6a to 6d are filled with highly viscous grease 8. During rotation of the flat spring 4, the grease 8 in the space 6a slowly flows through the gap between arcuate portion 3c-3 of the end segment 3c and the through-hole 4a into the space 6b, as indicated by a dashed arrow in FIG. 11B. The grease 8 in the space 6c also slowly flows through the gap between the arcuate portion 3c-4 of the end segment 3c and the through-hole 4a into the space 6d.

In accordance with such slow flow of the grease 8, the flat spring 4 slowly rotates, and subsequently, the inner circumferential portion of the through-hole 4a comes into contact with the end segment 3c, as illustrated in FIG. 11C. This mechanism prevents strong collision of the inner circumferential portion of the through-hole 4a with the end segment 3c. The grease 8 serves as cushioning material during contact of the inner circumferential portion of the through-hole 4a with the end segment 3c. As a result, the noise generated by contact of the inner circumferential portion of the through-hole 4a with the end segment 3c is reduced.

In the above description, the spaces 6 for retaining grease are formed at the four corners of the through-hole 4a by inserting the end segment 3c, which has a cross-section defined by the flat surfaces 3c-1 and 3c-2 and the arcuate portions 3c-3 and 3c-4, into the rectangular through-hole 4a. Alternatively, grease reserving portion may be deliberately formed.

Figure 12A:
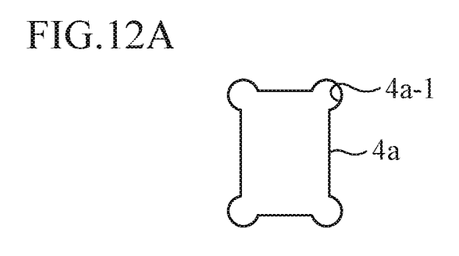
FIGS. 12A and 12B illustrate other examples of a through-hole of the flat spring and the end segment of the shaft.

With reference to FIG. 12A, the four corners of the through-hole 4a are provided with recessions 4a-1, for example. These recessions 4a-1 are extensions of the four corners of the through-hole 4a and thus serve as expansion spaces for expanding the spaces 6 which can thereby retain a larger amount of grease 8.

Figure 12B:
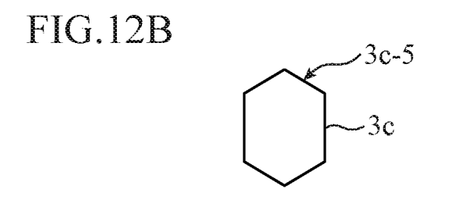

Alternatively, the end segment 3c may have a cross-section including chamfers 3c-5 at the four corners, as illustrated in FIG. 12B, in place of the cross-section having arcuate portions. Such a configuration can also provide expansion spaces between the end segment 3c and the four corners of the through-hole 4a and the expansion spaces can retain a larger volume of grease 8.

The through-hole 4a may have any shape if relative rotation with the end segment 3c over the fitting gap between the through-hole 4a and the end segment 3c is prevented. Any expansion space can be formed if such a function is achieved.

In the above, an example is shown in which an electronic apparatus having a hinge mechanism 1 according to the first embodiment is realized as a ceiling-mounted monitor device 7. However, the electronic device according to the present invention is not limited to such an apparatus.

That is, the hinge mechanism according to the present invention can be applied to any electronic device including a fixed member and a rotating body that is rotatably held on the fixed member.

As described above, in the hinge mechanism 1 according to the first embodiment, the through-hole 4a of the flat spring 4 has a shape that defines an opening area larger than the cross-sectional area of the end segment 3c of the shaft 3 and comes into contact with the circumferential portion of the rotating end segment 3c. The through-hole 5a of the plate 5 has an opening area larger than the cross-sectional area of the end segment 3c and smaller than that of the through-hole 4a.

The end segment 3c inserted through the through-holes 4a and 5a is swaged to retain grease 8 in the spaces 6 provided between the through-hole 4a and the end segment 3c.

In such a configuration, the grease 8 supplied to the spaces 6 slows down the movement of the flat spring 4, and thus can alleviate the collision of the inner circumferential portion of the through-hole 4a and the end segment 3c of the shaft 3 to reduce the collision noise.

Further, in the hinge mechanism 1 according to the first embodiment, by forming the recessions 4a-1 or the chamfers 3c-5 at the four corners of the through-hole 4a to form expansion spaces for expanding the spaces 6, it is possible to retain larger amount of grease 8.

Moreover, the electronic device according to the first embodiment includes a hinge mechanism 1 and a rotating body rotatably held on a fixed member by the hinge mechanism 1. For example, the rotating body is the monitor panel 7A and the fixed member is the accommodating case 7B.

According to such a configuration, it is possible to provide an electronic device in which noise generated when holding the rotational position of a rotating body is reduced.

Note that, any component or element according to the embodiments may be modified or omitted within the scope of the invention.

INDUSTRIAL APPLICABILITY

The hinge mechanism according to the present invention can reduce noise generated when holding the rotational position of a rotating body. Thus, it is suitable for a hinge for rotating a monitor panel of a ceiling-mounted monitor device installed on the ceiling of a vehicle.

REFERENCE SIGNS LIST 1 hinge mechanism 2 base 2a rotating-shaft hole 2b, 2c depression 2d screw hole 2e tapered portion 3 shaft 3a flange portion 3b small diameter segment 3c end segment 3c-1, 3c-2 flat surface 3c-3, 3c-4, 5b-1, 5b-2 arcuate portion 3c-5 chamfer 4 flat spring 4a, 5a through-hole 4a-1 recession 4b protrusion 5 plate 6, 6a to 6d space 7 monitor device 7A monitor panel 7A-1 latching depression 7B accommodating case 8 grease

The invention claimed is:

1. A hinge mechanism comprising:
a shaft fixed to a rotating body so as to be coaxial with a rotation axis of the rotating body;
a base member comprising a first engaging portion disposed on a concentric circle around the rotation axis, and rotatably supporting the shaft;
a flat spring member comprising a first through-hole through which an end segment of the shaft is inserted and a second engaging portion holding a rotational position of the rotating body by engaging with the first engaging portion and, the flat spring member rotating together with the end segment inserted through the first through-hole; and
a plate member comprising a second through-hole through which the end segment is inserted, the plate member being fixed to the shaft by swaging the end segment inserted through the first through-hole and the second through-hole, wherein,
the first through-hole has a shape that defines an opening area larger than a cross-sectional area of the end segment and comes into contact with a circumferential portion of the end segment when the shaft rotates,
the second through-hole has an opening area larger than the cross-sectional area of the end segment and smaller than the opening area of the first through-hole, and
a gap defined between a peripheral edge of an opening of the second through-hole and the end segment is covered with the end segment crushed by the swaging to retain viscous material in a closed space provided between the first through-hole and the end segment.

2. The hinge mechanism according to claim 1, wherein the closed space is expanded to include an expansion space defined by a recession formed in the first through-hole.

3. An electronic device comprising the hinge mechanism according to claim 1, the electronic device further comprising:
a fixed member; and
the rotating body rotatably held on the fixed member via the hinge mechanism.

* * * * *